United States Patent
Albert et al.

(10) Patent No.: US 10,626,847 B2
(45) Date of Patent: Apr. 21, 2020

(54) METHOD FOR MANUFACTURING A WIND TURBINE ROTOR BLADE ROOT SECTION WITH PULTRUDED RODS AND ASSOCIATED WIND TURBINE BLADE

(71) Applicant: General Electric Company, Schenectady, NY (US)

(72) Inventors: Bensely Albert, Greenville, SC (US); Daniel Alan Hynum, Greenville, SC (US); Amir Riahi, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 15/399,238

(22) Filed: Jan. 5, 2017

(65) Prior Publication Data
US 2018/0187645 A1    Jul. 5, 2018

(51) Int. Cl.
| | | |
|---|---|---|
| *F03D 1/06* | (2006.01) | |
| *B29D 99/00* | (2010.01) | |
| *B29C 70/48* | (2006.01) | |

(52) U.S. Cl.
CPC ............ *F03D 1/0675* (2013.01); *B29C 70/48* (2013.01); *B29D 99/0028* (2013.01);
(Continued)

(58) Field of Classification Search
CPC ...... F03D 1/0675; F03D 1/0658; F03D 13/10; F03D 9/35; B29C 70/48; B29C 70/467;
(Continued)

(56) References Cited

U.S. PATENT DOCUMENTS

| | | |
|---|---|---|
| 7,357,726 B2 | 4/2008 | Thorning |
| 7,530,168 B2 | 5/2009 | Sorensen et al. |

(Continued)

FOREIGN PATENT DOCUMENTS

| | | |
|---|---|---|
| CN | 102022288 A | 4/2011 |
| CN | 103817952 A | 5/2014 |

(Continued)

OTHER PUBLICATIONS

Extended European Search Report and Opinion issued in connection with corresponding EP Application No. 17210176.8 dated May 24, 2018.

*Primary Examiner* — Syed O Hasan
(74) *Attorney, Agent, or Firm* — Dority & Manning, P.A.

(57) ABSTRACT

A method for manufacturing a root section of a wind turbine blade includes assembling a mold having an inner cylinder segment, an outer cylinder segment, and a bottom flange, wherein a radial space is defined between the inner and outer cylinders. Root hub connectors are attached circumferentially around the bottom flange so that the root hub connectors extend axially into the radial space. A first cartridge of pultruded rods is loaded into the space, wherein the first cartridge includes a plurality of first pultruded rods arranged adjacent to the inner cylinder segment. The space is sealed, for example with a lid or top flange, and the space is evacuated. A resin is infused into the space so that the resin migrates through the radial space between the pultruded rods, and is then cured. The root section is then removed from the mold. A wind turbine blade root section formed by the method is encompassed by the invention.

18 Claims, 7 Drawing Sheets

(52) U.S. Cl.
CPC ....... *F05B 2220/30* (2013.01); *F05B 2230/21* (2013.01); *F05B 2240/30* (2013.01); *Y02E 10/721* (2013.01); *Y02P 70/523* (2015.11)

(58) Field of Classification Search
CPC .. B29C 70/323; F05B 220/30; F05B 2230/21; F05B 2240/30; B29D 99/0028
See application file for complete search history.

(56) References Cited

U.S. PATENT DOCUMENTS

| | | | |
|---|---|---|---|
| 8,172,538 B2 | 5/2012 | Hancock et al. | |
| 8,337,163 B2 | 12/2012 | Nies | |
| 8,529,818 B2* | 9/2013 | Simmerer | F03D 1/00 264/311 |
| 8,545,182 B2 | 10/2013 | Sorenson | |
| 8,727,731 B2 | 5/2014 | Bendel et al. | |
| 9,180,630 B2* | 11/2015 | Madsen | B29C 70/541 |
| 9,234,497 B2 | 1/2016 | Grove-Nielsen | |
| 2010/0295212 A1 | 11/2010 | Paspirgilis | |
| 2012/0207607 A1 | 8/2012 | Mironov | |
| 2013/0111752 A1 | 5/2013 | Madsen et al. | |
| 2013/0285284 A1 | 10/2013 | Moeller Larsen et al. | |
| 2014/0140853 A1 | 5/2014 | Feigl | |
| 2014/0234109 A1 | 8/2014 | Hayden et al. | |
| 2015/0017853 A1* | 1/2015 | Perillat-Collomb | B29C 70/467 442/1 |
| 2015/0226180 A1* | 8/2015 | Grove-Nielsen | F03D 1/0658 416/217 |
| 2015/0337797 A1 | 11/2015 | Grove-Nielsen | |
| 2015/0354531 A1 | 12/2015 | Kratmann | |
| 2015/0354542 A1 | 12/2015 | Kratmann | |
| 2015/0361950 A1 | 12/2015 | Pipo Benito | |
| 2016/0047355 A1 | 2/2016 | Feigl | |
| 2016/0053741 A1* | 2/2016 | Sabbadin | F03D 1/0658 416/230 |
| 2016/0221272 A1 | 8/2016 | Koefoed et al. | |
| 2017/0022968 A1* | 1/2017 | Caruso | F03D 1/0675 |

FOREIGN PATENT DOCUMENTS

| | | |
|---|---|---|
| CN | 104859160 A | 8/2015 |
| DE | 102011051172 A1 | 12/2012 |
| EP | 1 932 653 A1 | 6/2008 |
| EP | 2677170 A1 | 12/2013 |
| EP | 3 026 260 A1 | 6/2016 |
| JP | 2003293935 A | 10/2003 |
| KR | 101590795 B1 | 2/2016 |
| WO | WO03082551 A1 | 10/2003 |
| WO | WO2010149806 A1 | 12/2010 |
| WO | 2012/140039 A2 | 10/2012 |
| WO | WO2012140039 A2 | 10/2012 |
| WO | WO2012140039 A3 | 10/2012 |
| WO | 2014/041151 A2 | 3/2014 |

\* cited by examiner

FIG. 1

*Prior Art*

METHOD FOR MANUFACTURING A WIND TURBINE ROTOR BLADE ROOT SECTION WITH PULTRUDED RODS AND ASSOCIATED WIND TURBINE BLADE

FIELD OF THE INVENTION

The present subject matter relates generally to wind turbines and, more particularly, to a root configuration of a wind turbine rotor blade assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

Various proposals have been made for improving the blade root. For example, U.S. Pat. Pub. No. 2013/0111752 describes a problem with conventional wind turbine blades made of fiber reinforced plastic wherein the prevailing reinforcement fibers run in a longitudinal direction of the rotor blade, resulting in an "ovalization" of the root (also called root ring) once the blade is removed from the molding tool and is subjected to gravity forces without support at the root end. The '752 Publication proposes to assemble supporting rods with an interface section to a hub interface of the wind turbine in an essentially circular shape such that there are gaps between the supporting rods. Fibers are arranged in the gaps. A first molding tool is placed along an outer surface of the circular shape and a second molding tool along an inner surface of the circular shape. A resin is then injected between the supporting rods, which function as a support for the fibers and a structure for the interface section to the hub.

U.S. Pat. Pub. No. 2014/0119926 describes a cylindrical blade root section defined by an inner circumferential component and an outer circumferential component separated by a radial gap. A ring insert is disposed in the radial gap and is bonded to the inner and outer circumferential components. The ring insert has an inner circumferential surface and an outer circumferential surface, wherein at least one of these surfaces has a span-wise or circumferentially varying cross-sectional profile that increases the bonding surface area as compared to a constant or non-varying cross-sectional profile.

U.S. Pat. Pub. No. 2012/0315145 describes a blade root with cylinder-segment connecting members having stud-like connecting elements inserted in between respective fibers and/or the casting material of the rotor blade while moulding. The connecting members act as connecting means for aligning the connecting elements in a given geometrical relationship. Generally, the respective connecting members provide the blade root with additional mechanical stability, i.e. in particular stiffness so that ovalisation or deformation effects are avoided or at least reduced. The respective connecting members are adapted to transfer and/or distribute respective externally applied loads into the blade root structure of the rotor blade. The connecting elements may be integrally built with a respective connecting member or mounted to a respective connecting member.

A Publication from Sandia National Labs (SAND2003-0719 Unlimited Release Printed May 2003; http://windpower.sandia.gov/other/030719.pdf) includes a description of a method for installing root studs in a blade by directly embedding the studs within the laminate material to reduce the number of manufacturing process steps and tooling requirements. Dry fabric is rolled around each stud and folded material is placed between the studs prior to resin infusion.

U.S. Pat. No. 8,172,538 describes a method of manufacturing a wind turbine blade shell member having an incorporated fastening member near the root. The fastening member is positioned in a mold with pre-fabricated sticks surrounding a substantial longitudinal part of the fastening member prior to resin infusion. A guiding means is provided for aligning the fastening member relative to a further fastening member and/or relative to the mold during molding.

Thus, the industry is continuously seeking to provide a method for manufacturing wind turbine blade root sections with uniform structural properties in a cost-effective and timely fashion as compared to existing techniques.

BRIEF DESCRIPTION OF THE INVENTION

Aspects and advantages of the invention will be set forth in part in the following description, or may be obvious from the description, or may be learned through practice of the invention.

In accordance with certain aspects of the invention, a method is provided for manufacturing a root section of a wind turbine blade. The method includes assembling a mold having an inner cylinder segment, an outer cylinder segment, and a bottom flange, wherein a radial space is defined between the inner and outer cylinder segments. The mold may define a complete cylinder, wherein the inner and outer cylinder segments are complete cylinders, or may be formed in segments, wherein the inner and outer cylinder segments are partial cylinders. The method includes affixing a plurality of root hub connectors circumferentially around the bottom flange so that the root hub connectors extend axially into the radial space between the inner and outer cylinders. A first cartridge of pultruded rods is loaded into the radial space, wherein the first cartridge includes a plurality of first pultruded rods arranged adjacent to the inner cylinder segment. The space in the mold is sealed over, for example with a top flange (lid), vacuum bag, or other sealing member placed on the mold over the space, and the space is evacuated (e.g., a vacuum in drawn in the space). A resin is infused into the radial space and migrates through the radial space and into gaps or voids between the pultruded rods. The resin is then cured, wherein the final root section is formed with the plurality of pultruded rods encased in resin. The root section is then removed from the mold.

In a particular embodiment, the first cartridge of pultruded rods includes a first cylindrical support sleeve, wherein the pultruded rods are retained against the first cylindrical support sleeve, and the first cylindrical support sleeved is positioned against or around the inner cylinder segment. This embodiment may include means within the first cartridge for retaining the first pultruded rods against the first cylindrical support sleeve. In one embodiment, such means may include one of a tow material or fabric material wrapped around the first pultruded rods. In some embodiments, the fabric wrapping material may be layered throughout the first pultruded rods in the first cartridge. The pultruded rods may be attached to the fabric wrapping material. For example, the fabric may be woven around the pultruded rods, or the pultruded rods may be adhered to the fabric. The fabric is permeable to the resin and may be a dry fabric or pre-impregnated with resin (a "prepreg" fabric).

To reinforce the root in circumferential (i.e., hoop) direction, it may be desired to incorporate at least a certain amount of off axis fibers (non 0° fiber) in the root section. This reinforcing effect may be provided by placing dry fabric layers having fibers running predominantly in circumferential direction between the cartridges. If used, these layers may be compacted to reduce their bulk by drawing a vacuum on mold cavity to draw the resin between the rods and cartridge, as well as the fabrics. The vacuum essentially presses the rods to fabric and compacts them.

In a particular embodiment, the first pultruded rods have the same length and diameter, and may be made of the same material. In another embodiment, the first pultruded rods have any one or combination of different length, different diameter, or different material.

The infusion step may, in a certain embodiment, include rotationally driving the mold to generate centrifugal force that drives the resin through the radial space gaps and voids between the pultruded rods.

In a certain embodiment, the method may include loading a second cartridge of pultruded rods into the radial space between the inner and outer cylinder segments concentric with the first cartridge of pultruded rods, wherein the second cartridge includes a plurality of second pultruded rods arranged against a second cylindrical support sleeve. For example, the first cartridge of pultruded rods may be placed around the inner cylinder of the mold, and the second cartridge of pultruded rods may be placed around the first cartridge of pultruded rods. In this embodiment, the second pultruded rods may have the same or a greater length than the first pultruded rods. Alternatively, the second pultruded rods may have any one or combination of different length, different diameter, or different material as compared to the first pultruded rods.

The plurality of root hub connectors may be individual root inserts that extend axially into the space between the pultruded rods and are bolted to the bottom flange (from outside of the mold). The root inserts may be connected together in an assembly that is placed in the space prior to bolting the root inserts to the bottom flange. The root inserts may be textured or wrapped with a fabric prior to being placed in the space to ensure that the inserts remain embedded in the resin.

The present invention also encompasses a rotor blade assembly for a wind turbine, the blade having a pressure side and a suction side extending between a leading edge and a trailing edge. The blade assembly includes a molded cylindrical blade root section extending span-wise from the pressure side and suction side to an end face of the blade root section that is configured to attach the rotor blade assembly to a hub. The blade root section further comprises a first cartridge of a plurality of first pultruded rods infused with a hardened resin between and around the first pultruded rods. The root section also includes a plurality of root hub connectors circumferentially spaced around the end face of the blade root section and extending span-wise between the first pultruded rods.

The blade root section may include any of the features or characteristics discussed above with respect to the method of making an exemplary root section.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention relates to a unique blade root section (and method of making such blade root section), wherein the root section exhibits improved strength and structural properties and can be manufactured in a fast and efficient automated manner.

Figure 1:
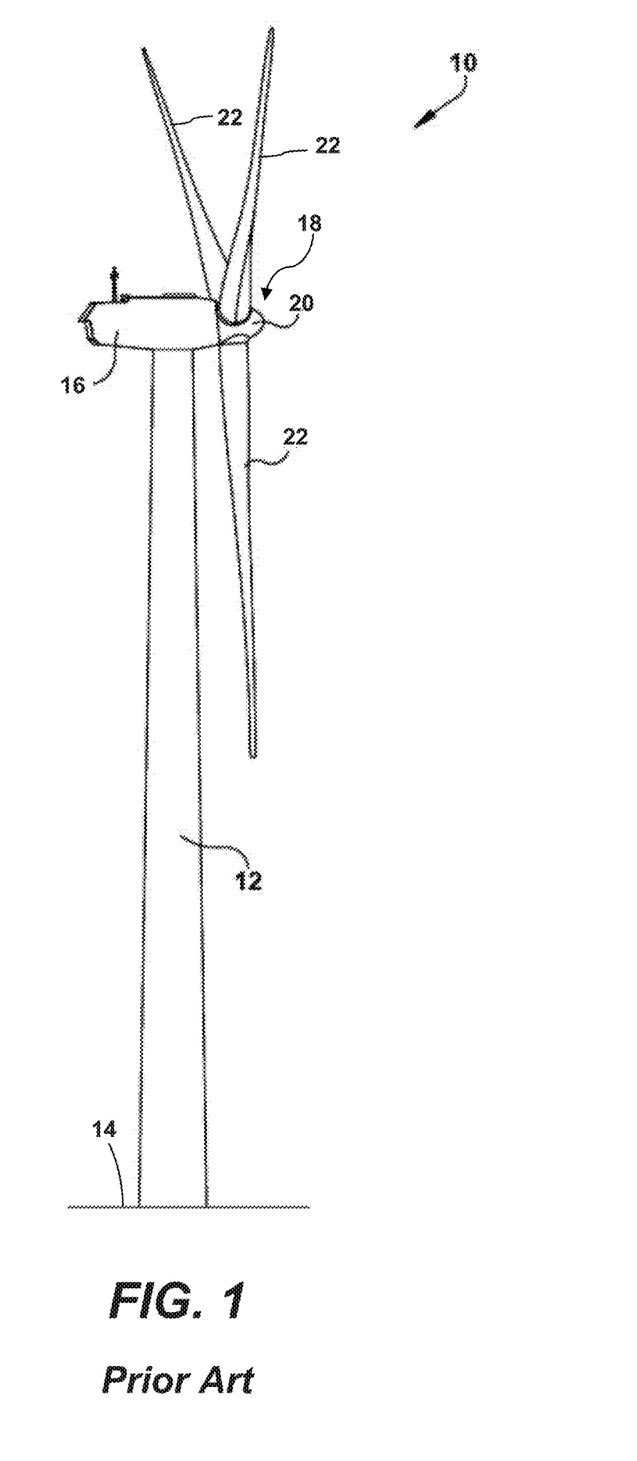
FIG. 1 illustrates a perspective view of a conventional wind turbine.

Referring to the drawings, FIG. 1 illustrates a perspective view of a conventional wind turbine 10 to place the present invention in its operating environment. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade assembly 22 coupled to and extending outwardly from the hub 20. For example, in the illustrated embodiment, the rotor 18 includes three rotor blade assemblies 22. However, in an alternative embodiment, the rotor 18 may include more or less than three rotor blade assemblies 22. Each rotor blade assembly 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
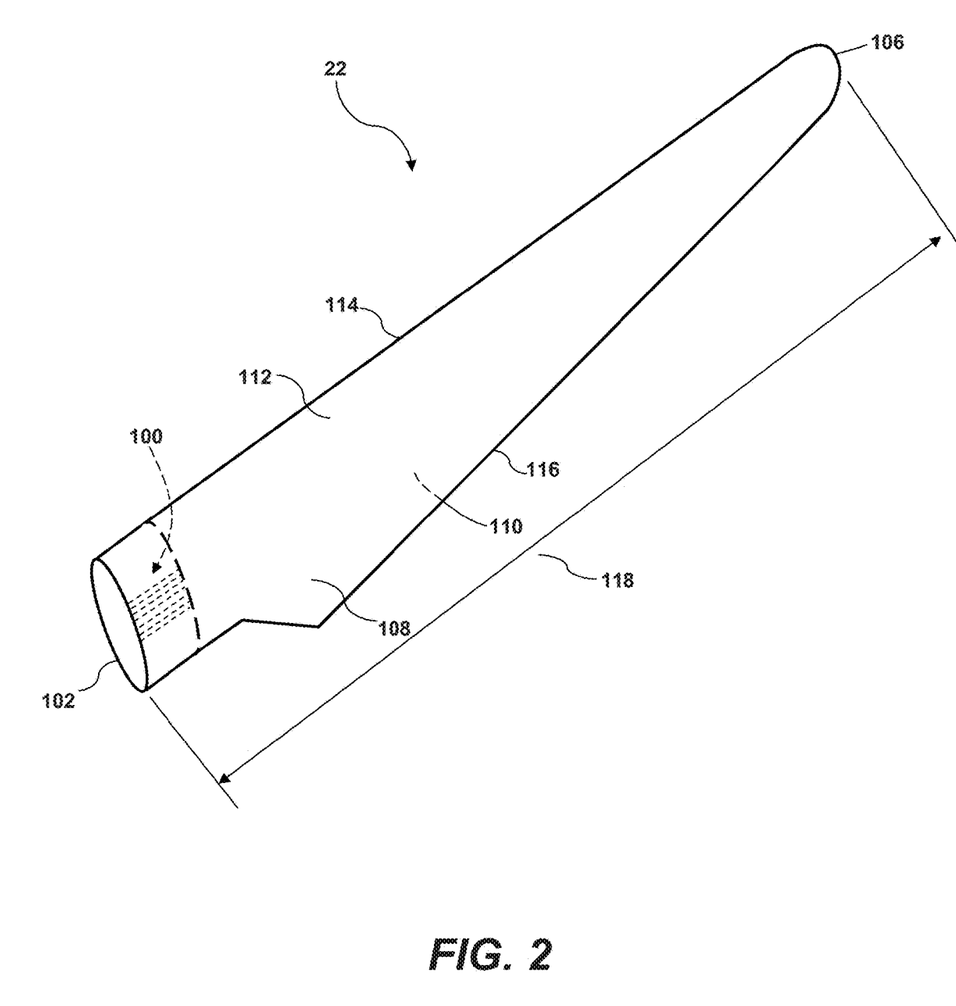
FIG. 2 illustrates a perspective view of one embodiment of a rotor blade assembly of a wind turbine with a blade root section according to the present disclosure.

Referring now to FIG. 2, there is illustrated one embodiment of a rotor blade assembly 22 with a blade root section 100 in accordance with the present invention. More specifically, the rotor blade assembly 22 includes a shell 108 defining a pressure side 110 and a suction side 112 between a leading edge 114 and a trailing edge 116. The shell 108 may generally be configured to extend between the blade root section 100 and a blade tip 106 disposed opposite the blade root section 100 and may serve as the outer casing/covering of inner load bearing structure of the blade. Further, the rotor blade assembly 22 may have a span 118 defining the total length between the blade root section 100 and the blade tip 106. The blade root section 100 may have a generally cylindrical shape and may extend span-wise from the pressure side 110 and suction side 112 to an end face 102 of the root section 100. Further, the blade root section 100 is configured to attach the rotor blade assembly 22 to the hub 18 of the wind turbine 10 (FIG. 1).

Figure 3:
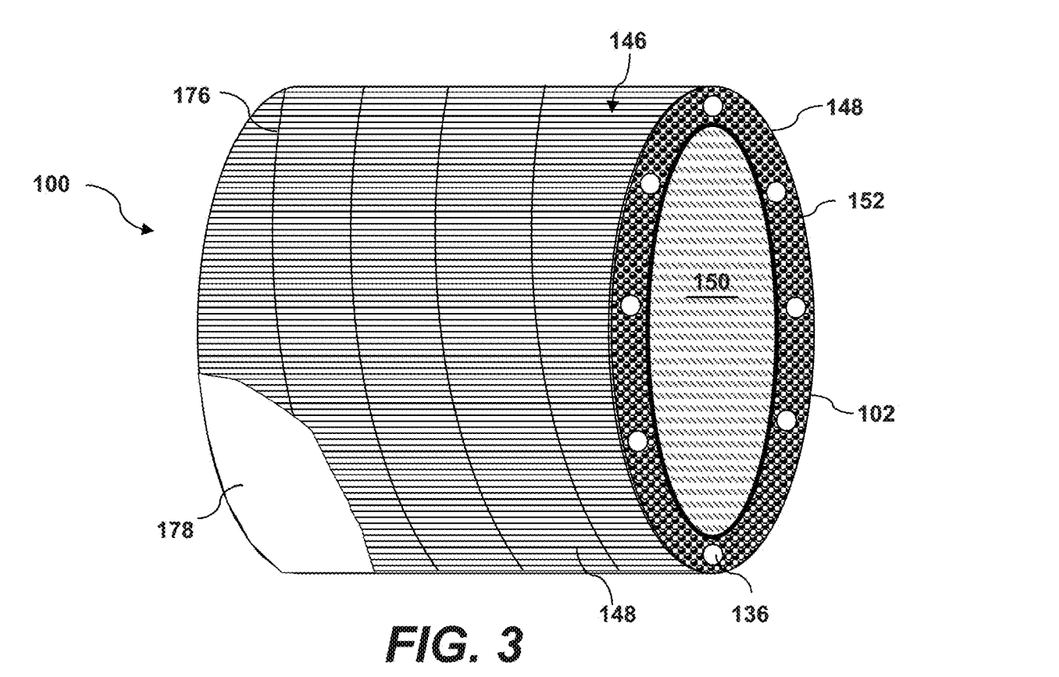
FIG. 3 is a perspective view of an embodiment of a blade root section in accordance with the present invention.

Referring to FIG. 3, an embodiment of a blade root section 100 includes a plurality of first pultruded rods 148 arranged in a cylindrical formation and may be considered as a first cartridge 146 of pultruded rods. "Pultruded rods" are generally understood in the art to encompass fiberglass reinforced plastic rods (FRP rods) manufactured through the pultrusion process. These rods are solid and composed of polyester resin and fiberglass. It is understood that, through the pultrusion process, it is possible to vary the resin system and enhance the glass content properties of the rods in order to meet specific designs and applications. Because pultrusion material is lightweight and strong, it is often much more efficient than steel, aluminum or structural timber. Pultruded rods (or tubes) are recognized to perform well in bending and tension (pulling) applications since all the fibers are oriented along the length of the tube (or rod). The parts are made in the pultrusion process by pulling the fibers through a shaped die while simultaneously injecting with resin to create the required profile. For purposes of the present disclosure wherein the pultruded rods are used in a blade root section 100, the pultruded rods may have a diameter within a range of 3.0 mm (0.009 kg/m) to 37.5 mm (2.010 kg/m). The length of the rods will vary depending on the overall length of the blade root section 100. Other sized rods are also within the scope and spirit of the present invention.

In the particular embodiment depicted in FIG. 3, the first cartridge 146 includes a first cylindrical support sleeve 150 around which the rods 148 are retained. As explained below with reference to FIG. 10, this first cylindrical support sleeve 150 is not required in all embodiments.

Within the first cartridge 146, the first pultruded rods 148 have the same length and diameter, and may be made of the same material. In other embodiments, the first pultruded rods 148 within any given cartridge may have any one or combination of different length, different diameter, or different material.

Referring still to FIG. 3, the first cylindrical support sleeve 150 (and any other second or third support sleeves) may be a FRP tube (pultruded product). The sleeve 150 serves to provide a foundation around which the rods 148 are arranged (explained in greater detail below) and, in this regard, the sleeve can be relatively thin.

Figure 4:
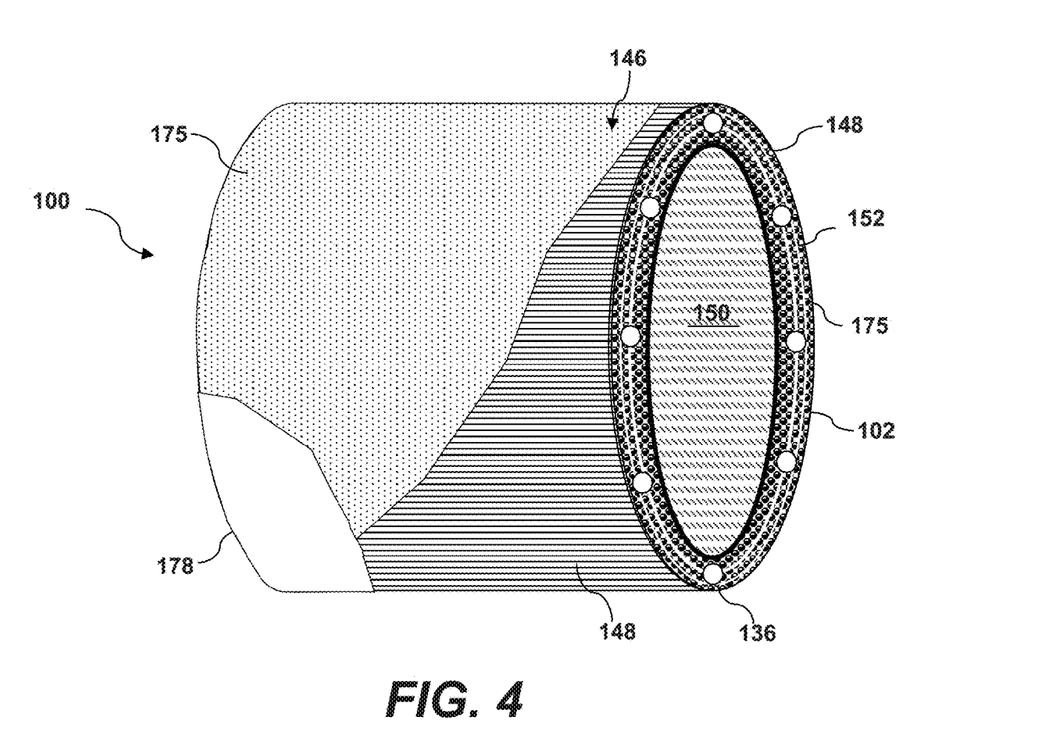
FIG. 4 is a perspective view of an alternative embodiment of a blade root section in accordance with the present invention.

Means may be provided to retain the rods 148 in a cylindrical arrangement around the support sleeve 150. For example, a fiberglass tow 176 may be wrapped around the rods 148 in a rope-like manner to hold the pultruded rods 148 in an arranged pattern (having a defined "radial thickness") around the sleeve 150. In the embodiment of FIG. 4, a permeable fabric wrapping material 175 is wrapped around the rods 148 and may be layered throughout the rods 148, as depicted in FIG. 4. For example, alternating layers of fabric material 175 and rods 148 may be contained within any given cartridge. The fabric material 175 may be a biaxial or unidirectional fiber material, or combinations thereof within the cartridge 146. Also, in this embodiment, the pultruded rods 148 may be attached to the fabric wrapping material 175. For example, the fabric 175 may be woven around the pultruded rods 148, or the pultruded rods 148 may be adhered to the fabric 175. The fabric 175 is permeable to the resin and may be a dry fabric or pre-impregnated with resin (a "prepreg" fabric).

In the molding process (as explained below), a resin 152 is infused between the pultruded rods 148 and cured such that the finished blade root section 100 is defined by the plurality of rods 148 encased within a hardened resin around the support sleeve 150, as depicted in FIG. 3.

As represented in FIG. 3, the blade root section 100 also includes a plurality of root hub connectors 136 circumferentially spaced around the end face 102 of the blade root section 100. These hub connectors 136 serve to attach the root section 100 (and thus the blade assembly 22) to the wind turbine hub 20, as is well-known in the industry. Various types of hub connectors 136 are known, and the present blade root section 100 can accommodate all such devices. In the illustrated embodiment, the hub connectors 136 include a tapered insert 142 (FIG. 6) that extends span-wise between the rods 148. The inserts 142 have a threaded hole defined therein and are engaged by threaded connectors on the blade hub 20 when installing the blade assembly 22 to the hub 20. The inserts 142 may be textured or wrapped in a fabric material to ensure that the inserts 142 remain embedded in the resin 152 between the rods 148.

In other embodiments, the inserts may be conventional T-bolt connectors seated in the end face of the root section 100.

Figure 5:
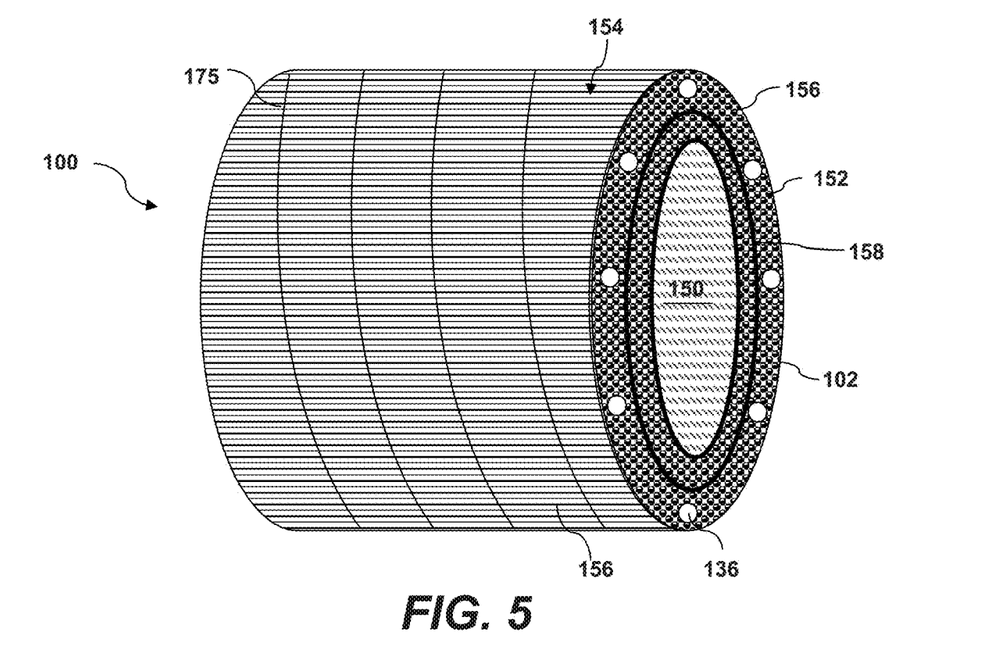
FIG. 5 is a perspective view of still another embodiment of a blade root section in accordance with the present invention.

Referring to FIG. 5, embodiments of the blade root section 100 may include multiple cartridges. For example, the blade root section 100 includes first cartridge 146 of first pultruded rods 148 and sleeve 150, and an additional second cartridge 154 of second pultruded rods 156 arranged concentrically a second cylindrical support sleeve 158, wherein the cartridges 146 and 158 are concentric. In this embodiment, the second pultruded rods 156 may have the same or a greater length than the first pultruded rods 148. Likewise, the second pultruded rods 156 may have any one or combination of different length, different diameter, or different material as compared to the first pultruded rods 148, or within the second pultruded rods 156 themselves. The characteristics of the rods 146, 156 may be selected to give the overall root section 100 desired strength and other physical characteristics.

The various sleeves 150, 158, and 174 (FIG. 11) may include holes, slots, or other passages for the resin to diffuse into and through the different cartridges.

Figure 10:
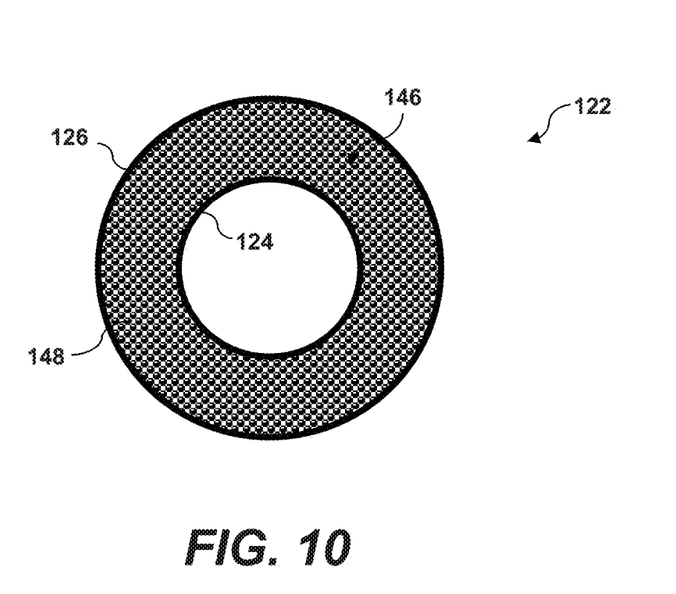
FIG. 10 is a top view of an embodiment of a blade root section within a mold.
Figure 11:
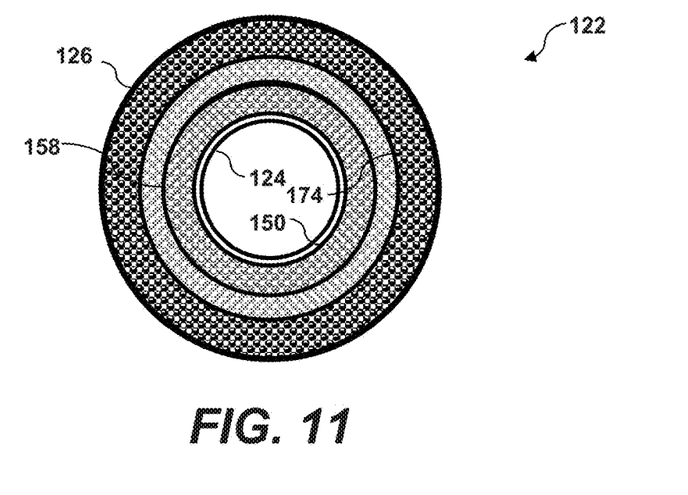
FIG. 11 is a top view of an alternative embodiment of a blade root section within a mold.

FIGS. 10 and 11 (discussed in greater detail below) depict an embodiment wherein the blade root section 100 incorporates three concentric rod cartridges 146, 154, and 170 with respective rods 148, 156, and 172 arranged around respective support sleeves 150, 158, and 174.

A finished blade root section 100 may include an outer skin layer 178 (FIGS. 3 and 4) applied over the rod/resin matrix. This layer 178 may be formed in the same molding process that forms the rod/resin matrix, or by a subsequent process.

The present invention also encompasses various methods for manufacturing the blade root section 100 described herein. Referring to FIGS. 6 through 11, various aspects of an exemplary method are illustrated. The method includes assembling a mold 122 having an inner cylinder segment 124 and an outer cylinder segment 126, wherein a radial concentric space is defined between the cylinder segments 124, 126.

Figure 6:
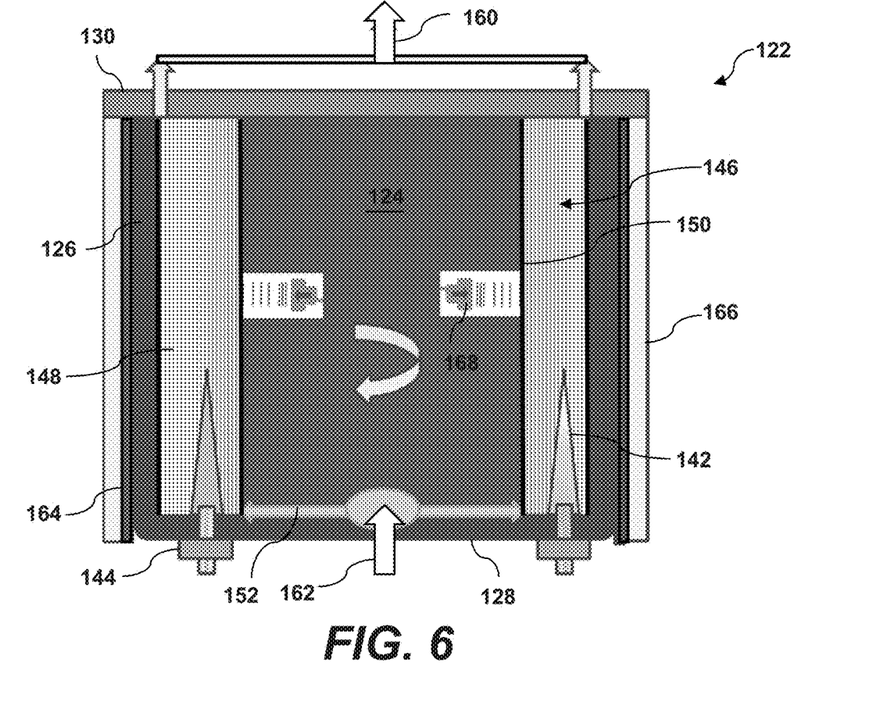
FIG. 6 illustrates certain aspects of a molding process for making a blade root section; a top view along line A-A of the embodiment of FIG. 4 according to the present invention.
Figure 7:
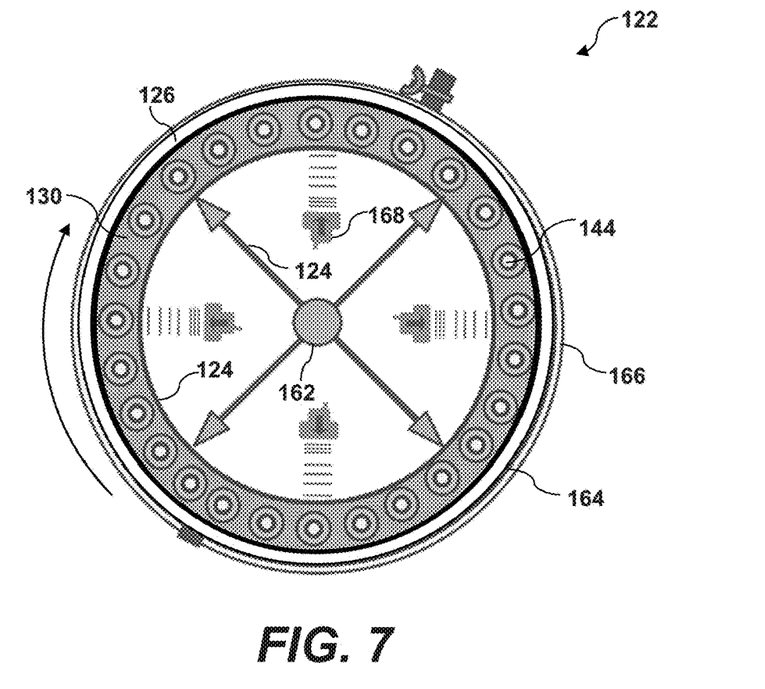
FIG. 7 illustrates certain other aspects of the molding process for a complete cylindrical root section.

The cylinder segments 124, 126 may be complete cylinders, as depicted in FIGS. 6 and 7, wherein the root section 100 is molded as a complete cylinder. It may be desired to subsequently cleave the root section 100 into separate segments for shipping and other logistical considerations. The separate segments can then be connected together with adhesive or other means upon final assembly of the wind turbine blade.

Figure 8:
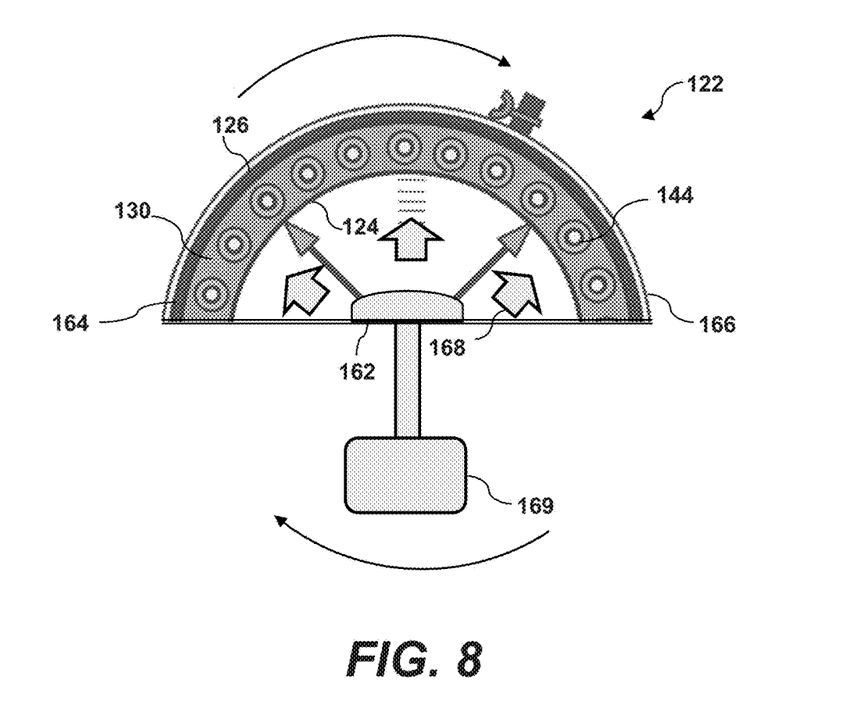
FIG. 8 illustrates aspects of the molding process for a single semi-cylindrical root section.

FIG. 8 depicts a molding 122 wherein the cylinder segments 124, 126 are partial cylindrical segments, wherein segmented portions of the root section 100 are formed. These segmented portions may be connected together upon final assembly of the wind turbine blade. The mold 122 includes a counter weight configuration 169 that allows the entire mold 122 to be rotated so as to generate sufficient centrifugal force to cause resin from the resin source 162 to migrate through the radial space between the cylinder segments 124, 126 and around the pultruded rods 148.

Figure 9:
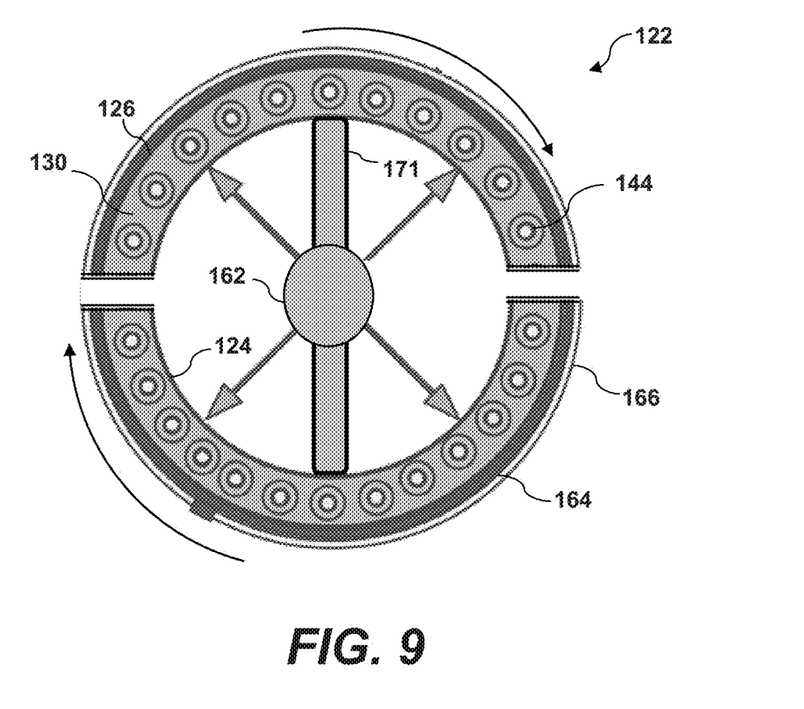
FIG. 9 illustrates aspects of the molding process for dual semi-cylindrical root sections.

FIG. 9 depicts a molding 122 wherein dual segmented portions are simultaneously produced. Pairs of semi-cylindrical segments 124, 126 are connected together by a bar 171 or other connecting member in a rotationally balanced configuration. The separate segments can then be connected together with adhesive or other means upon final assembly of the wind turbine blade.

A bottom flange 128 is connected to the cylinder segments 124, 126. Certain embodiments of the method further include affixing a plurality of root hub connectors 136 circumferentially around the bottom flange 128 so that the root hub connectors 136 extend into the space between the inner 124 and outer 126 cylinders. In the illustrated embodiment, for example, the hub connectors 136 include root inserts 142 that bolted to the inner side of the bottom flange 128 with external bolts 144.

A first cartridge 146 of pultruded rods 148 is loaded into the space between the mold cylinders 124, 126. As discussed above, the first cartridge 146 includes a plurality of first pultruded rods 148, which may or may not be arranged around a first cylindrical support sleeve 150. For example in the embodiment of FIG. 10 wherein the mold includes a single cartridge (first cartridge 146), the rods 148 may be placed around the inner cylinder segment 124 without a support sleeve. In other embodiments, as depicted in FIGS. 10 and 11 for example, each cartridge 146, 154, and 170 includes a respective support sleeve 150, 158, and 174.

Means are provided for sealing over the space in the mold. For example, a top flange (lid) 130 may be placed on the mold 122 to essentially seal the first cartridge 146 in the space between the cylinders 124, 126. In another embodiment, a vacuum bag may be used to seal the space. Other sealing means or members are within the scope and spirit of the invention. The space is then evacuated via a vacuum source 160 in communication with the space, as depicted in FIG. 6. As mentioned above, the vacuum aids in compaction of the rods and any additional fiber layer sheets placed between the cartridges. For example, to reinforce the root in circumferential (i.e., hoop) direction, it may be desired to incorporate at least a certain amount of off axis fibers (non 0° fiber) in the root section by placing dry fabric layers having fibers running predominantly in circumferential direction between the cartridges. If used, these layers may be compacted to reduce their hulk by drawing a vacuum on mold cavity to draw the resin between the rods and cartridge, as well as the fabrics. The vacuum essentially presses the rods to fabric and compacts the components in the root section.

Resin 152 is then infused from a source 162 into the space, as depicted in FIGS. 5 and 6. The resin migrates through the space and into gaps or voids between the pultruded rods 148. The mold 122 may be rotationally driven, as depicted by the arrow in FIGS. 7 and 8, to create a centrifugal force that better drives the resin 152 between the rods 148. The mold 122 may also be wrapped in a heater element 164 and insulation jacket 166 to aid in the infusion process.

As mentioned above, the various sleeves 150, 158, and 174 may include holes, slots, or other passages for the resin to diffuse into and through the different cartridges.

A plurality of ultrasonic transducers 168 may be spaced around the mold 122, for example around the inner diameter surface of the cylinder 124, to aid in compaction of the pultruded rods before and/or during the curing process.

After the infusion process, the resin 152 is cured in the mold 122.

As discussed above, in a particular method embodiment, the first pultruded rods 148 may have the same length and diameter, and may be made of the same material, as depicted in FIG. 6. In another embodiment, the first pultruded rods have any one or combination of different length, different diameter, or different material.

Figure 12:
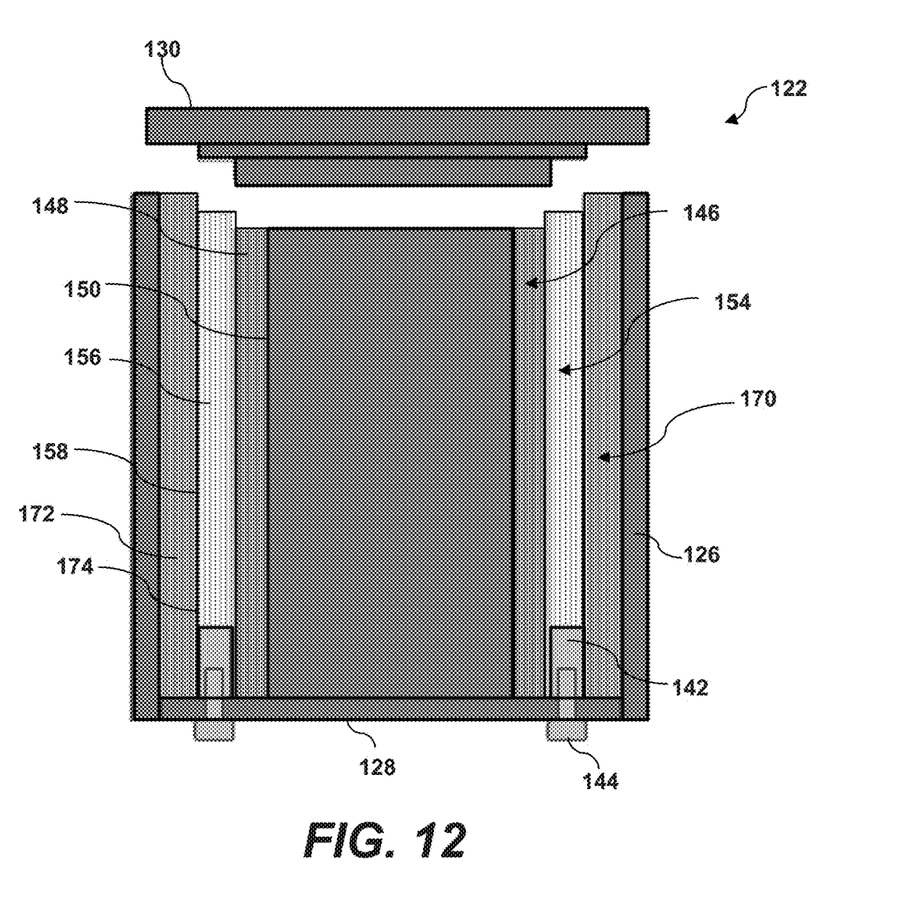
FIG. 12 is a side cut-away view of an embodiment of a blade root section within a mold.

In a certain method embodiments depicted in FIGS. 5, 11 and 12, the method may include loading a second cartridge 154 of pultruded rods 156 into the space between the inner 124 and outer 126 cylinders concentric with the first cartridge 146 of pultruded rods 148. As with the first cartridge 146, the second cartridge 154 includes the rods 156 arranged around a second cylindrical support sleeve 158. The rods 156 may be retained around the sleeve 158 with means discussed above, such as a fiberglass tow 176 (FIG. 3) or fiberglass wrapping fabric 175 (FIG. 4). The second pultruded rods 156 may have the same length as the first pultruded rods 148 or, as depicted in FIG. 10, may have a different length. Alternatively, the second pultruded rods 156 may have any one or combination of different length, different diameter, or different material as compared to the first pultruded rods or with each other.

FIGS. 11 and 12 depict an embodiment wherein a third cartridge 170 is loaded into the mold 122, the third cartridge 170 having third pultruded rods 172 arranged around a third cylindrical support sleeve 174. As with the other cartridges, the rods 172 may have the same or a different length as compared to the rods 148, 156 of the other cartridges.

Referring to FIG. 12, it is appreciated that, when removed from the mold 122, the cartridges will have a stepped height profile of pultruded rods, wherein the rods 172 in the third cartridge 170 have a greater axial length than the rods 156 in the second cartridge 154, which have a greater axial length than the rods 148 in the first cartridge 146. The rods within a given cartridge may have the same length, or may have a decreasing height profile (towards a centerline of the root section 100). This configuration saves substantial material costs and manufacturing time in the subsequent lay-up process of connecting the root section to the blade shells. In the conventional process, the root section must be machined into a tapered profile for lay-up of fiberglass sheets between the root section and blade shells. The present method provides a tapered profile that requires little final machining, which can be done with the root section still in the mold or removed from the mold.

The infusion process discussed above may result in a uniform and smooth outer resin layer around the pultruded rods, wherein such layer constitutes an outer skin layer 178 of the blade root section 100. Alternatively, the skin layer 178 may be a resin or other material layer applied to the root section over the outermost cartridge after the root section 100 is removed from the mold 122.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a root section of a wind turbine blade, the method comprising:
   assembling a mold having an inner cylinder segment, an outer cylinder segment, and a bottom flange, wherein a radial space is defined between the inner and outer cylinder segments;
   affixing a plurality of root hub connectors circumferentially around the bottom flange so that the root hub connectors extend into the radial space;
   loading a first cartridge of pultruded rods into the radial space, wherein the first cartridge includes a plurality of first pultruded rods;
   sealing over the space in the mold, and evacuating the radial space;
   infusing a resin into the radial space so that the resin migrates between the first pultruded rods, and curing the resin;
   removing the cured root section from the mold;
   the first cartridge of pultruded rods comprising a span wise length so as to extend axially beyond the root hub connectors when loading the first cartridge of pultruded rods into the radial space; and
   the first cartridge of pultruded rods comprising a first cylindrical support sleeve extending along the spanwise length of the first cartridge of pultruded rods, wherein the first pultruded rods are positioned around and retained against the first cylindrical support sleeve prior to loading the first cartridge of pultruded rods into the radial space such that, upon loading the first cartridge of pultruded rods, the first cylindrical support sleeve is positioned against the inner cylinder segment and each of the root hub connectors is axially surrounded by the first pultruded rods.

2. The method as in claim 1, further comprising providing means within the first cartridge for retaining the first pultruded rods against the first cylindrical support sleeve prior to loading the first cartridge of pultruded rods into the radial space.

3. The method as in claim 2, wherein the retaining means comprises one of a tow material or fabric material wrapped around the first pultruded rods.

4. The method as in claim 2, wherein the retaining means comprises a fabric wrapping material layered throughout the first pultruded rods in the first cartridge.

5. The method as in claim 4, wherein the first pultruded rods are attached to the fabric wrapping material.

6. The method as in claim 1, wherein the first pultruded rods have a same length and diameter.

7. The method as in claim 1, wherein the first pultruded rods have any one or combination of different length, different diameter, or different material.

8. The method as in claim 1, wherein the infusing step further comprises rotationally driving the mold to generate centrifugal force that drives the resin through the radial space between the first pultruded rods.

9. The method as in claim 1, further comprising loading a second cartridge of pultruded rods into the radial space concentric with the first cartridge of pultruded rods, wherein the second cartridge includes a plurality of second pultruded rods arranged around and retained against a second cylindrical support sleeve prior to loading the second cartridge of pultruded rods into the radial space.

10. The method as in claim 9, wherein the second cartridge of pultruded rods is placed around the first cartridge of pultruded rods.

11. The method as in claim 10, wherein the second pultruded rods have any one or combination of different length, different diameter, or different material as compared to the first pultruded rods.

12. The method as in claim 1, wherein the plurality of root hub connectors are root inserts that are bolted to the bottom flange and extend axially between the pultruded rods.

13. The method as in claim 12, wherein the root inserts are connected together in an assembly that is placed in the radial space prior to bolting the root inserts to the bottom flange.

14. The method as in claim 12, wherein the root inserts are textured or wrapped with a fabric prior to being placed in the space.

15. The method as in claim 1, wherein the mold defines a partial cylinder, the inner and outer cylinder segments being partial cylindrical segments.

16. The method as in claim 1, wherein the mold defines a complete cylinder, the inner and outer cylinder segments being complete cylindrical segments.

17. A rotor blade assembly for a wind turbine, comprising: a pressure side and a suction side, the pressure side and suction side extending between a leading edge and a trailing edge; a molded cylindrical blade root section extending span-wise from the pressure side and suction side to an end face of the blade root section that is configured to attach the rotor blade assembly to a hub; the blade root section further comprising: a first cartridge of a plurality of first pultruded rods infused with a hardened resin between and around the first pultruded rods; a plurality of root hub connectors circumferentially spaced around the end face of the blade root section, each of the root hub connectors extending span-wise between and surrounded by the first pultruded rods; the first cartridge of pultruded rods comprising a spanwise length so as to extend axially beyond the root hub connectors along the blade root section; the first cartridge of pultruded rods comprising a first cylindrical support sleeve extending along the span-wise length of the first cartridge of pultruded rods: and means, separate from the hardened resin, for retaining the first pultruded rods around and against the first cylindrical support sleeve prior to curing of the hardened resin.

18. The rotor blade assembly as in claim 17, further comprising a second cartridge of pultruded rods concentric with the first cartridge of pultruded rods, wherein the second cartridge includes a plurality of second pultruded rods retained around and against a second cylindrical support sleeve with means, separate from the hardened resin, for retaining the second pultruded rods around and against the second cylindrical support sleeve.

* * * * *